(12) United States Patent
Fagrenius et al.

(10) Patent No.: US 7,801,576 B2
(45) Date of Patent: Sep. 21, 2010

(54) WIRELESS COMMUNICATIONS DEVICES WITH SELF-CLEANING DISPLAYS

(75) Inventors: Nils Gustav Fagrenius, Dalby (SE); Sven Rune Fredrik Palmqvist, Staffanstorp (SE); Johan Martin Wedel, Kävlinge (SE); Carl Magnus Waldt, Kävlinge (SE); Eva Tina Rålin, Malmö (SE); Sten Ola Håkansson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1139 days.

(21) Appl. No.: 11/450,741

(22) Filed: Jun. 9, 2006

(65) Prior Publication Data

US 2007/0287515 A1 Dec. 13, 2007

(51) Int. Cl.
*H04M 1/00* (2006.01)
(52) U.S. Cl. .................................. 455/575.1; 455/90.1
(58) Field of Classification Search .............. 455/550.1, 455/575.1, 575.2, 90.1–90.3; 379/433.01, 379/433.13
See application file for complete search history.

(56) References Cited

FOREIGN PATENT DOCUMENTS

| JP | 2003158566 | 5/2003 |
|---|---|---|
| JP | 2003298708 | 10/2003 |
| JP | 2004198874 | 7/2004 |
| JP | 2004312143 | 11/2004 |
| JP | 2005045484 | 2/2005 |
| JP | 2006030247 | 2/2006 |
| KR | 10-2005-0027491 | 3/2005 |
| KR | 10-2005-0036598 | 4/2005 |

OTHER PUBLICATIONS

Invitation to Pay Additional Fees for PCT/EP2006/069153; date of mailing Feb. 3, 2007.
International Search Report and Written Opinion of the International Searching Authority, corresponding to PCT/EP2006/069153, mailed Jul. 12, 2007.

*Primary Examiner*—Sam Bhattacharya
(74) *Attorney, Agent, or Firm*—Myers Bigel Sibley & Sajovec, P.A.

(57) ABSTRACT

Radiotelephones, having self-cleaning display screens are provided. A radiotelephone includes a first housing portion having a display screen located thereon. A second housing portion is movably connected to the first housing portion, and the first and second housing portions are movable relative to one another between a closed position and an open position. An elongated cleaning member is movably secured to the first housing portion, and is configured to wipe the display screen in response to movement of the first and second housing portions between the open and closed positions.

10 Claims, 5 Drawing Sheets

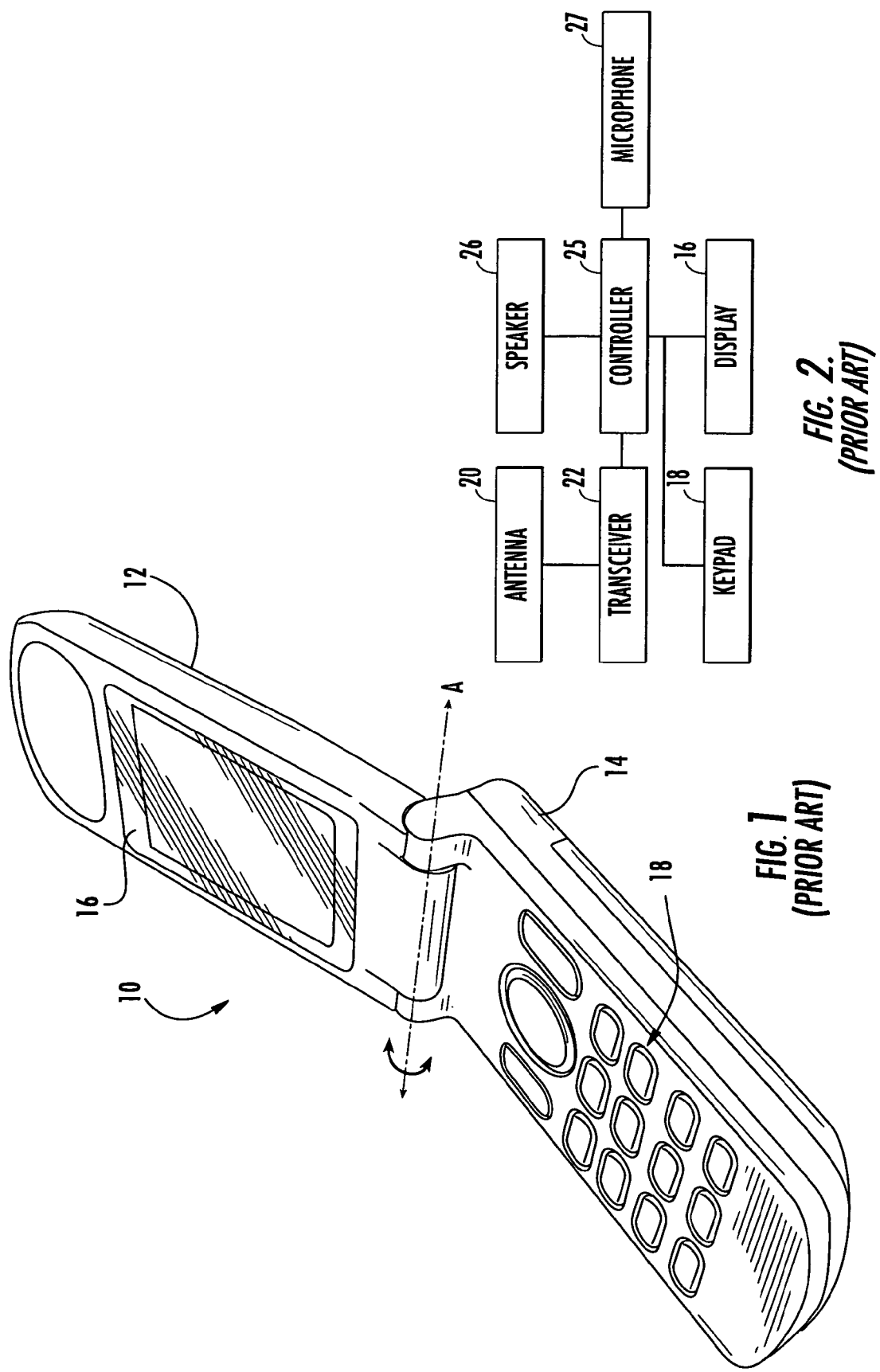

WIRELESS COMMUNICATIONS DEVICES WITH SELF-CLEANING DISPLAYS

FIELD OF THE INVENTION

The present invention relates generally to displays, and more particularly to displays used with communication devices, such as radiotelephones.

BACKGROUND OF THE INVENTION

Radiotelephones typically include a user interface comprising a microphone, a display, and a data input device, such as a keypad. These telephones are typically used to initiate a call to another user via the keypad. Once the call is initiated, the user positions the telephone in close proximity to his or her ear and mouth so as to listen to the speaker and speak into the microphone, i.e., communicate audibly, with the other user. During use, the telephone is positioned such that the user is unable to view or utilize the display. To accommodate video functionality, the displays of many radiotelephones are increasing in size.

Because radiotelephones are handled often and utilized near the faces of users, the displays of radiotelephones may become greasy or smudgy in appearance. Moreover, displays with touch-screen capabilities are especially susceptible to becoming smudgy. Users typically attempt to clean these displays by wiping them with articles of clothing or other materials. Unfortunately, such cleaning methods may not adequately clean a display, and may actually scratch or otherwise damage a display. Moreover, it can be an annoying problem to have to constantly clean a display screen. Accordingly, there is a need for improved methods of cleaning the displays of communication devices such as radiotelephones.

SUMMARY OF THE INVENTION

In view of the above discussion, wireless communications devices, such as radiotelephones, having self-cleaning display screens are provided. According to some embodiments of the present invention, a radiotelephone includes a first housing portion having a display screen located thereon. A second housing portion is movably connected to the first housing portion, and the first and second housing portions are movable relative to one another between a closed position and an open position. An elongated cleaning member is movably secured to the first housing portion, and is configured to wipe the display screen in response to movement of the first and second housing portions between the open and closed positions.

According to some embodiments of the present invention, a drive belt is movably disposed within the first housing portion and is operatively connected to a hinge connecting the first and second housing portions. The drive belt moves in a first direction in response to movement of the first and second housing portions from a closed position to an open position, and moves in an opposite second direction in response to movement of the first and second housing portions from an open position to a closed position. The elongated cleaning member is operatively connected to the drive belt and moves in the first direction to wipe the display screen when the first and second housing portions are moved from a closed position to an open position. The elongated cleaning member moves in the second direction to wipe the display screen when the first and second housing portions are moved from an open position to a closed position.

According to some embodiments of the present invention, a radiotelephone includes a first housing portion having a display screen located thereon. A second housing portion is slidably connected to the first housing portion such that the first and second housing portions are slidable relative to one another between a retracted position and an extended, operative position. An elongated cleaning member is movably secured to the first housing portion and is configured to wipe the display screen in response to movement of the first and second housing portions between the retracted and extended positions.

BRIEF DESCRIPTION OF THE DRAWINGS

FIG. 1 is a perspective view of a conventional radiotelephone having a display screen.

FIG. 2 is a schematic block diagram of a conventional arrangement of electronic components within the radiotelephone of FIG. 1.

DETAILED DESCRIPTION OF THE INVENTION

Figure 3A:
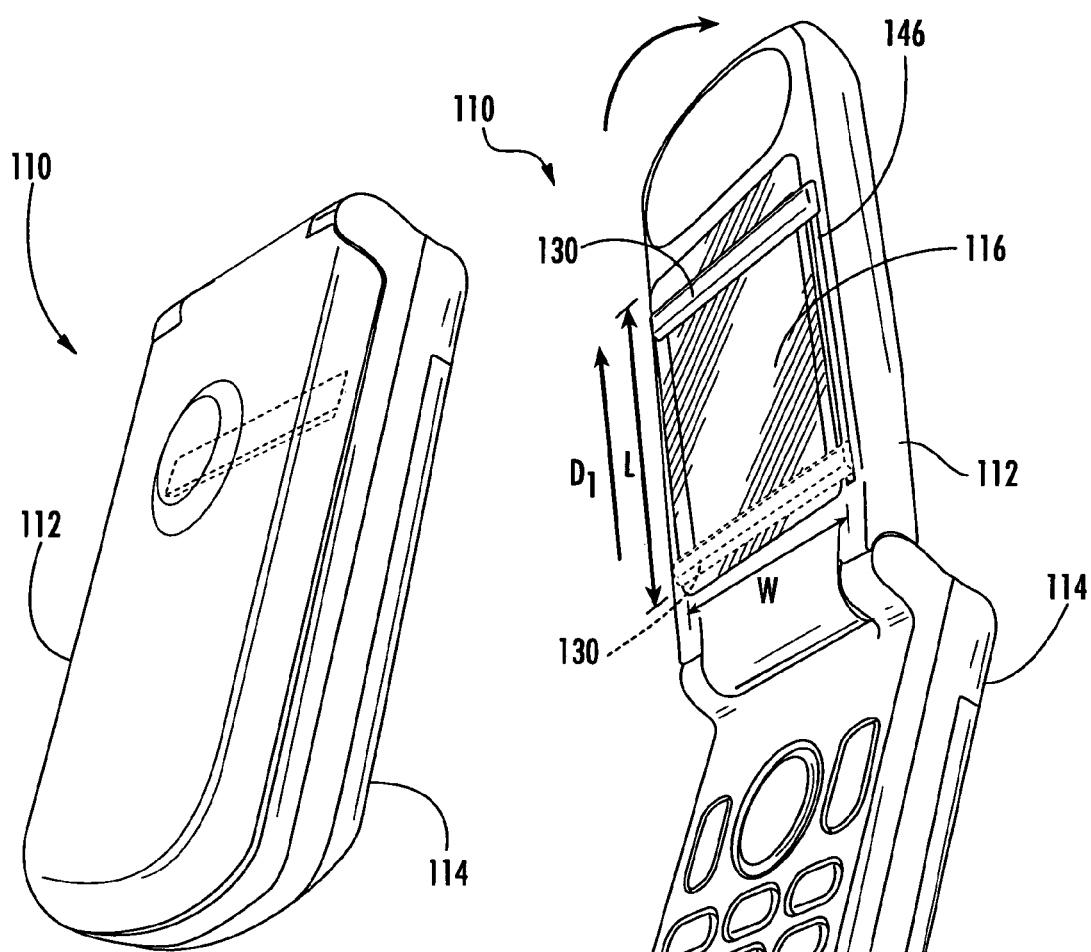
FIG. 3A is a perspective view of a "flip" radiotelephone having a cleaning member configured to wipe a display screen thereof, according to some embodiments of the present invention, and wherein the first and second housing portions of the radiotelephone are in a closed position.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

Referring to FIG. 1, a conventional handheld radiotelephone 10 in which a self-cleaning display screen can be incorporated, according to embodiments of the present invention, is illustrated. However, self-cleaning display screens, according to embodiments of the present invention, can be incorporated into any type of wireless communications device. The term "wireless communications device" may include, but is not limited to, a cellular wireless terminal with or without a multi-line display; a Personal Communications System (PCS) terminal that may combine a cellular wireless terminal with data processing, facsimile and data communications capabilities; a PDA that can include a wireless terminal, pager, Internet/intranet access, Web browser, organizer, calendar and/or a global positioning system (GPS) receiver; and a conventional laptop and/or palmtop receiver or other appliance that includes a wireless terminal transceiver. Wireless communications devices may also be referred to as "pervasive computing" devices and may be mobile terminals.

The illustrated radiotelephone 10 includes a first housing portion 12 and a second housing portion 14 hingedly connected together. The first housing portion 12 includes a display screen 16 and the second housing portion 14 includes a keypad 18. Housed within one or both of the first and second housings 12, 14 are electronic components (not shown) that enable the radiotelephone 10 to transmit and receive radiotelephone communications signals. The display screen 16 is configured to display sequences of alphanumeric characters that represent telephone numbers to be dialed, other commands to be executed by the radiotelephone 10, SMS messages to be transmitted by the radiotelephone 10, video transmitted to the radiotelephone 10, etc., as would be understood by one skilled in the art of radiotelephones.

In operation, the first and second housing portions 12,14 may be pivoted relative to one another by a user about an axis A between an open position and a closed position. When in a closed position, the first housing portion 12 may provide protection to the keypad 18 from unintentional activation or exposure to the elements. When in an open position, the first housing portion 12 may provide a convenient extension to the radiotelephone 10.

Referring now to FIG. 2, a conventional arrangement of electronic components that enable a radiotelephone, such as illustrated in FIG. 1, to transmit and/or receive wireless terminal communications signals will be described in further detail. As illustrated, an antenna 20 for receiving and/or transmitting wireless communications signals is electrically connected to a radio-frequency (RF) transceiver 22 that is further electrically connected to a controller 25, such as a microprocessor. The controller 25 is electrically connected to a speaker 26 that is configured to transmit a signal from the controller 25 to a user of a wireless communications device. The controller 25 is also electrically connected to a microphone 27 that receives a voice signal from a user and transmits the voice signal through the controller 25 and transceiver 24 to a remote device. The controller 25 is electrically connected to the keypad 18 and the display screen 16 that facilitate radiotelephone operation.

Figure 3B:
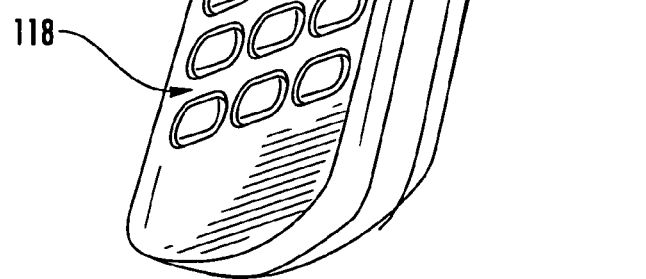
FIG. 3B is a perspective view of the radiotelephone of FIG. 3A, wherein the first and second housing portions have been moved to an open position and the cleaning member has moved in a first direction to clean the display screen.
Figure 3C:
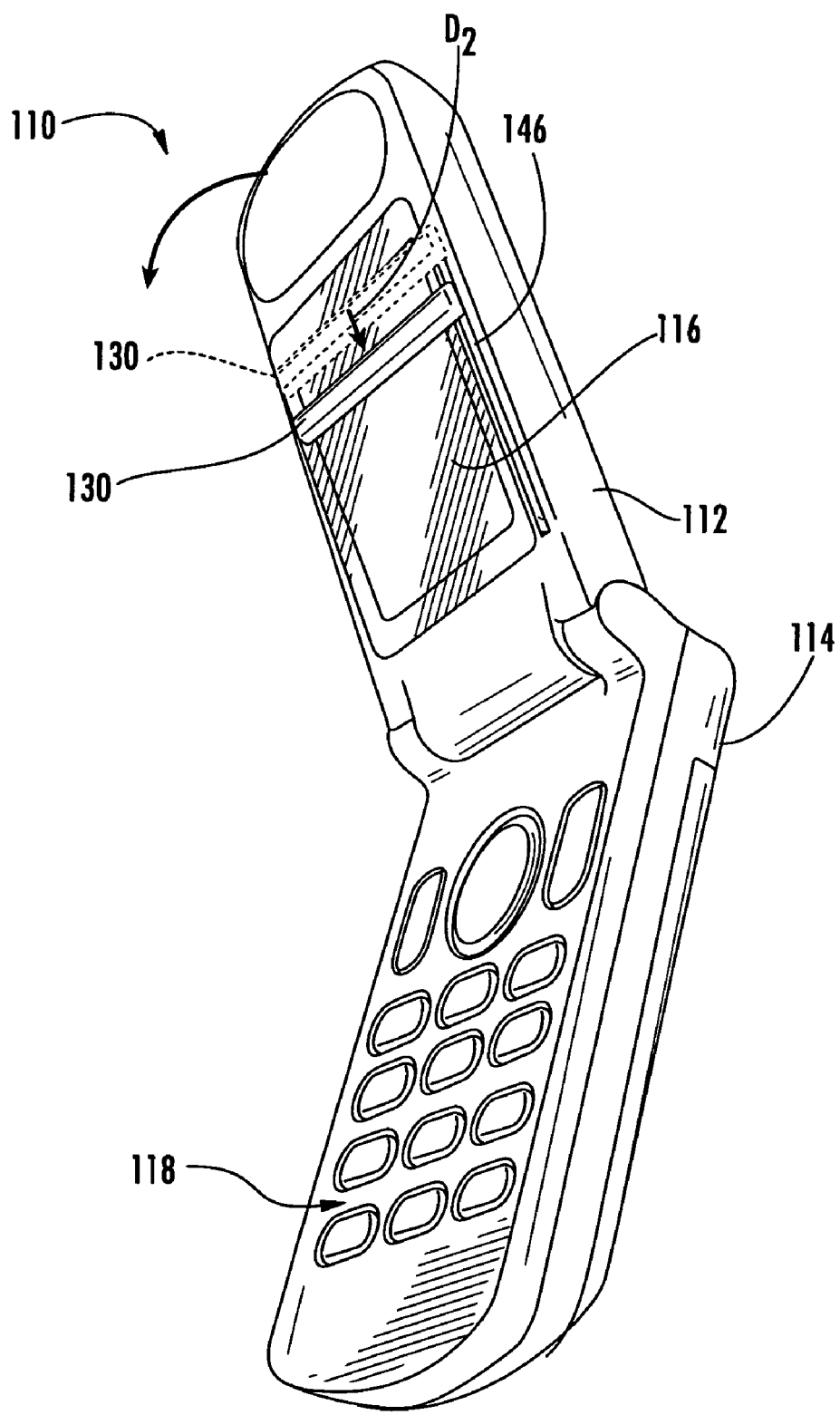
FIG. 3C is a perspective view of the radiotelephone of FIG. 3B, wherein the first and second housing portions are being moved to a closed position and the cleaning member is moving in the second direction to clean the display screen.

Referring now to FIGS. 3A-3C, a radiotelephone 110 having a self-cleaning display screen 116, according to some embodiments of the present invention, is illustrated. The illustrated radiotelephone 110 includes a first housing portion 112 and a second housing portion 114 hingedly connected together, as would be understood by one skilled in the art of radiotelephones. The first housing portion 112 includes a display screen 116 and the second housing portion 114 includes a keypad 118. In operation, the first and second housing portions 112,114 may be pivoted by a user relative to one another about an axis A between a closed position (FIG. 3A) and an open position (FIG. 3B).

An elongated cleaning member 130 is movably secured to the first housing portion 112, as illustrated. The cleaning member 130 is configured to wipe the display screen 116 in response to movement of the first and second housing portions 112, 114 between the open and closed positions. For example, in FIG. 3B, the first housing portion 112 is being pivoted to an open position. As a result, the cleaning member 130 is moved along the display 116 in the direction indicated by $D_1$. Referring to FIG. 3C, the first and second housing portions 112, 114 are being pivoted, relative to one another, to a closed position. As a result, the cleaning member 130 is moved along the display 116 in an opposite, second direction indicated by $D_2$.

The illustrated radiotelephone display screen 116 has a two-dimensional configuration with a width W and length L. In the illustrated embodiment, the cleaning member 130 extends along a direction substantially parallel with the width W of the display screen and moves along a direction substantially parallel with the length L of the display screen. However, embodiments of the present invention are not limited to the illustrated configuration. For example, according to other embodiments, the cleaning member 130 may extend along a direction substantially parallel with the length L of the display screen and move along a direction substantially parallel with the width W of the display screen 116.

According to some embodiments of the present invention, the cleaning member 130 includes a soft, absorbent material that wipes the display screen 116. The soft, absorbent material may be selected from any of various types of materials including, but not limited to, woven materials, nonwoven materials, etc. According to some embodiments of the present invention, the cleaning member 130 may be replaceable and/or the soft, absorbent material of the cleaning member 130 may be replaceable.

Figure 4:
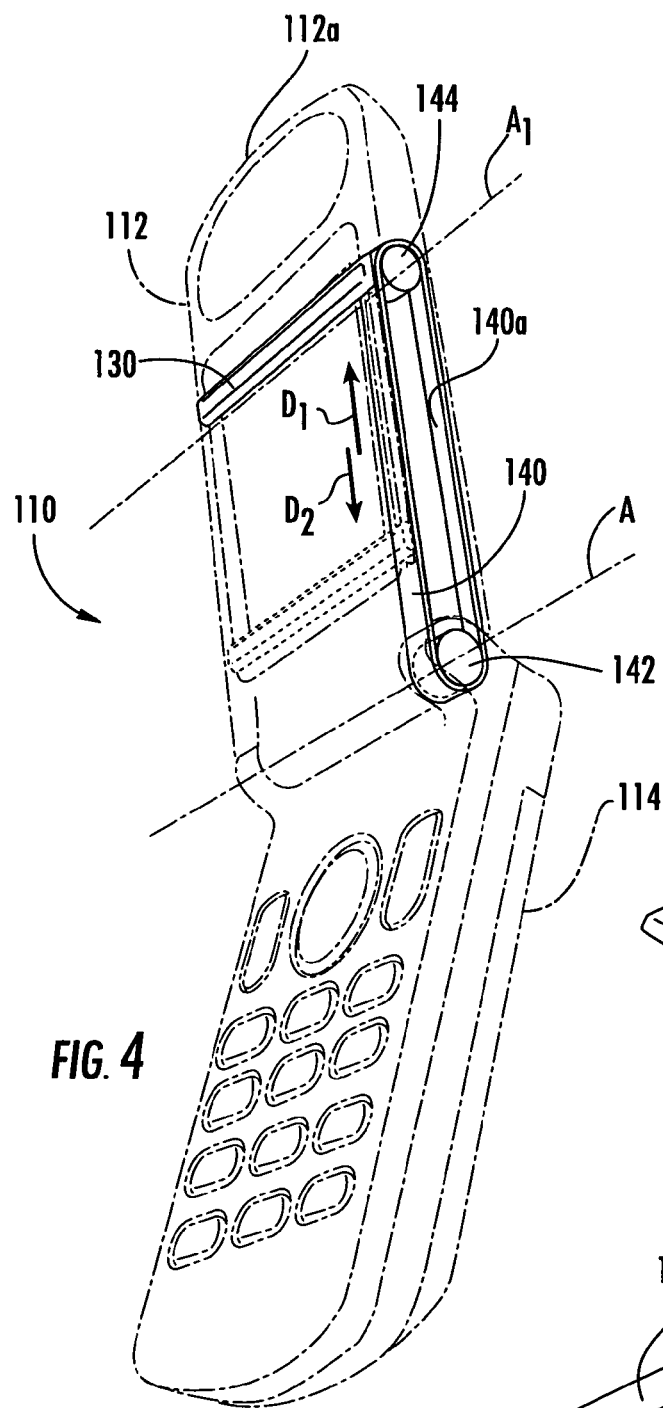
FIG. 4 is a perspective view of the radiotelephone of FIGS. 3A-3B illustrating a drive belt that moves the cleaning member in response to movement of the first and second housing portions, according to some embodiments of the present invention.
Figure 5:
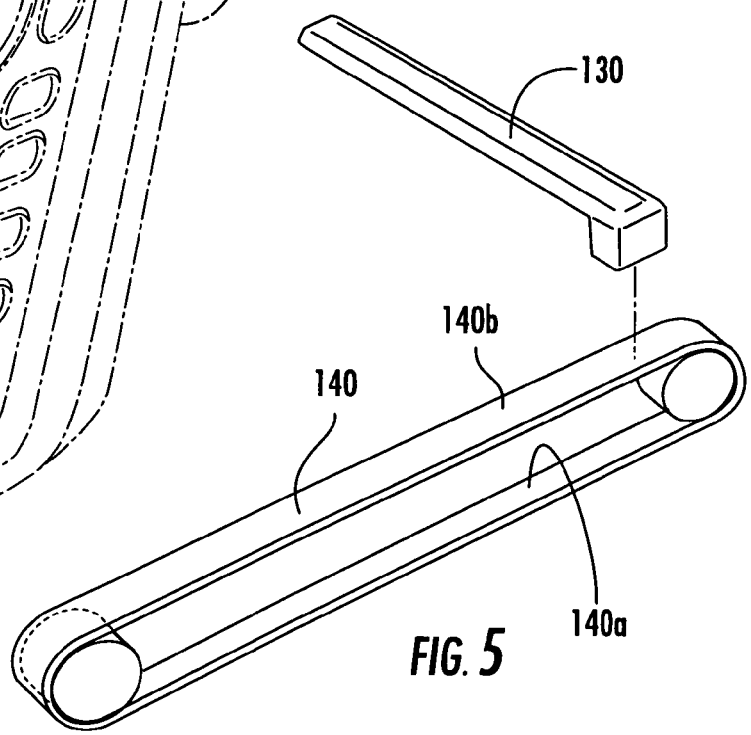
FIG. 5 is an exploded perspective view of the drive belt and cleaning member of FIG. 4.

Referring to FIGS. 4 and 5, operation of the cleaning member 130 in FIGS. 3A-3C, according to some embodiments of the present invention, will be described further. In the illustrated embodiment, the cleaning member 130 is attached to and driven by an endless drive belt 140 that is movably disposed within the first housing portion 112. A driving sprocket 142 is operably associated with the hinge that connects the first and second housing portions 112, 114 and rotates in response to opening and closing of the first and second housing portions 112, 114. For example, as would be understood by one skilled in the art of radiotelephones, the driving sprocket 142 may be attached to a pin or other member (not shown) that serves as a hinge connecting the first and second housing portions 112, 114. Any type of connection that allows the driving sprocket 142 to rotate about axis A in response to opening a closing the radiotelephone 110 will be suitable.

An idler sprocket 144 is located within the first housing portion 112 near the distal end 112a thereof and is configured to freely rotate about an axis $A_1$ that is substantially parallel with rotational axis A. The endless drive belt 140 is trained around the driving sprocket 142 and idler sprocket 144 for driving the cleaning member 130. When the driving sprocket 142 is rotated in the clockwise direction, as viewed from the perspective of FIG. 4, the drive belt 140 moves along direction $D_1$. Clockwise rotation of the driving sprocket 142 is caused by moving the first and second housing portions 112, 114 relative to one another to an open position. When the driving sprocket 142 is rotated in the counter-clockwise direction, as viewed from the perspective of FIG. 4, the drive belt 140 moves along direction $D_2$. Counter-clockwise rotation of the driving sprocket 142 is caused by moving the first and second housing portions 112, 114 relative to one another to the closed position.

Referring back to FIGS. 3B-3C, the cleaning member 130 is attached to the drive belt 140 via a slot 146 in the first housing portion 112. The illustrated slot 146 is positioned adjacent the display screen 116 along the length of the display screen 116. The cleaning member 130 may be attached to the drive belt in any of various known ways (e.g., adhesively attached, molded thereto, attached via a fastener, etc.) and may be removably secured thereto to facilitate replacement thereof.

The drive belt 140 may be formed from any known elastomeric types of materials and may also be reinforced if desired. The drive belt 140 has a back or inner surface 140a that faces the driving sprocket 142 and idler sprocket 144 and an outer surface 140b to which the cleaning member 130 is attached. The inner surface 140a may be configured to frictionally engage the driving sprocket 142 and idler sprocket 144. Alternatively, the driving and/or idler sprockets 142, 144 may have teeth that are configured to engage with corresponding teeth on the inner surface 140a of the drive belt 140 so as to be positively and drivingly engaged thereby. The driving sprocket 142 and idler sprocket 144 may be formed from virtually any type of material, without limitation.

Figures 6A, 6B:
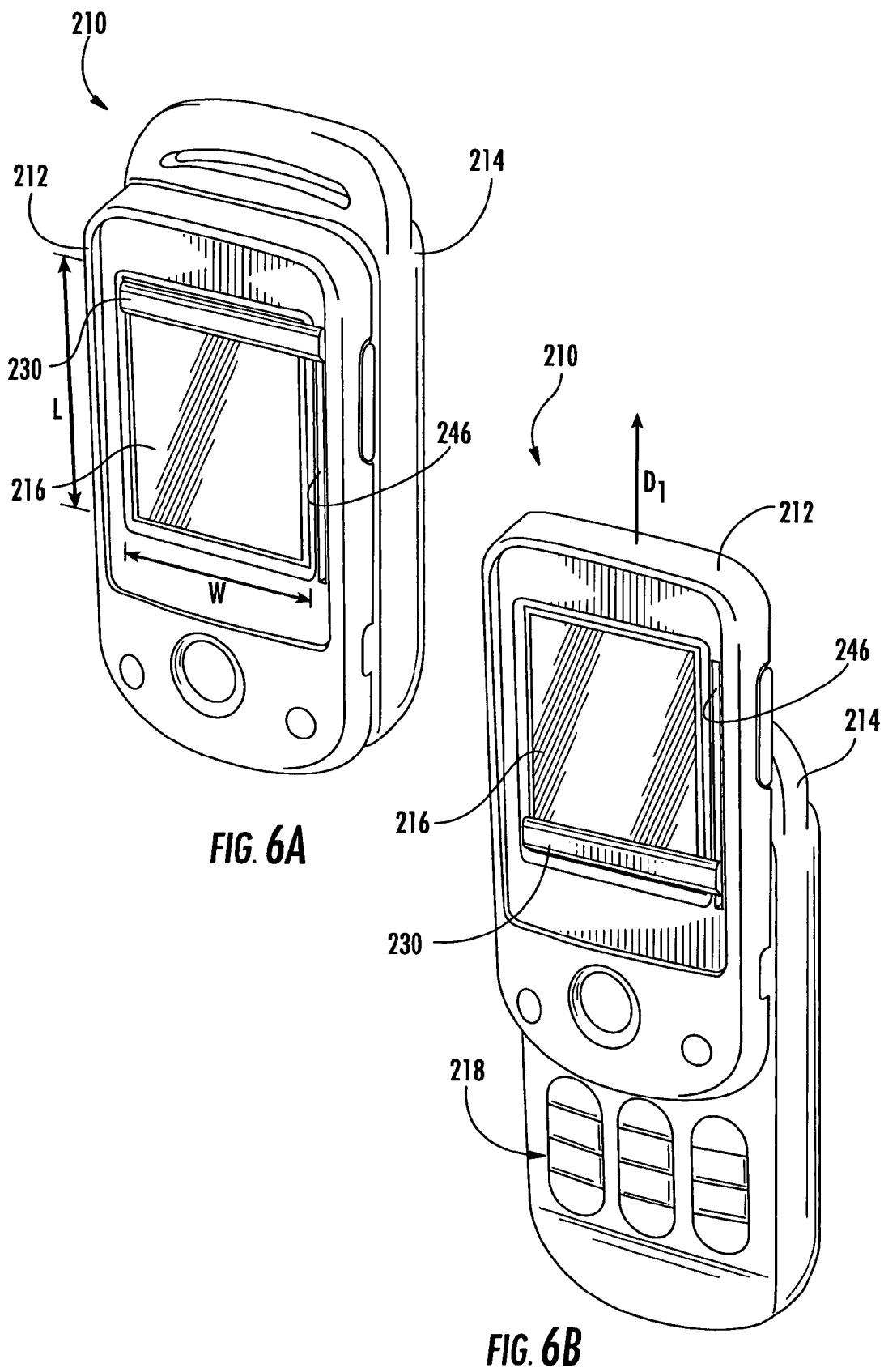
FIG. 6A is a perspective view of a "slider" radiotelephone having a cleaning member configured to wipe a display screen thereof, according to some embodiments of the present invention, and wherein the first and second housing portions of the radiotelephone are in a retracted position.
FIG. 6B is a perspective view of the radiotelephone of FIG. 6A wherein the first and second housing portions of the radiotelephone are in an extended position.

Referring to FIGS. 6A-6B, a radiotelephone 210 having a self-cleaning display 216, according to some embodiments of the present invention, is illustrated. The illustrated radiotelephone 210 includes a first housing portion 212 and a second housing portion 214 slidably connected to the first housing portion 212. The first housing portion 212 includes a display screen 216 and the second housing portion 214 includes a keypad 218. The first and second housing portions 212, 214 are slidable relative to one another between a retracted position (FIG. 6A) and an extended, operative position (FIG. 6B). An elongated cleaning member 230 is movably secured to the first housing portion 212 and is configured to wipe the display screen 216 in response to movement of the first and second housing portions 212, 214 between the retracted and extended positions.

According to some embodiments of the present invention, the elongated cleaning member 230 is fixedly secured to the second housing portion 214 and movable relative to the first housing portion 212 via an elongated slot 246 in the first housing portion 212. The cleaning member 230 is configured to wipe the display screen 216 in response to movement of the first and second housing portions 212, 214 between the retracted and extended configurations positions. For example, in FIG. 6B, the first housing portion 212 is being moved to the extended position along direction $D_1$. As a result, the display screen 216 moves beneath the cleaning member 230 in the direction indicated by $D_1$ and is cleaned by the cleaning member 230. When the first housing portion 212 is moved to the retracted position, the display screen 216 moves beneath the cleaning member 230 and is cleaned by the cleaning member 230.

The illustrated radiotelephone display screen 216 has a two-dimensional configuration with a width W and length L. In the illustrated embodiment, the cleaning member 230 extends along a direction substantially parallel with the width W of the display screen 216 and moves along a direction substantially parallel with the length L of the display screen 216. However, embodiments of the present invention are not limited to the illustrated configuration. For example, according to other embodiments, the cleaning member 230 may extend along a direction substantially parallel with the length L of the display screen and move along a direction substantially parallel with the width W of the display screen 216.

According to some embodiments of the present invention, the cleaning member 230 includes a soft, absorbent material that wipes the display screen 216. The soft, absorbent material may be selected from any of various types of materials including, but not limited to, woven materials, nonwoven materials, etc. According to some embodiments of the present invention, the cleaning member 230 may be replaceable and/or the soft, absorbent material may be replaceable.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A radiotelephone, comprising:
a first housing portion;
a display screen located on the first housing portion;
a second housing portion movably connected to the first housing portion via a hinge, wherein the first and second housing portions are movable relative to one another between a closed position and an open position;
a driving sprocket and idler sprocket disposed within the first housing portion in spaced apart relationship, wherein the driving sprocket is directly connected to the hinge and rotates in response to movement of the first and second housing portions between open and closed positions;
an endless drive belt trained around the driving sprocket and idler sprocket, wherein the endless belt moves along a first direction in response to movement of the first and second housing portions from the closed position to the open position, and along an opposite second direction in response to movement of the first and second housing portions from the open position to the closed position; and
an elongated cleaning member attached to and driven by the endless belt, wherein the cleaning member is configured to wipe the display screen in response to movement of the first and second housing portions between open and closed positions.

2. The radiotelephone of claim 1, wherein the display screen has a two-dimensional configuration with a width and length, and wherein the cleaning member extends along a direction substantially parallel with the width of the display screen and moves along a direction substantially parallel with the length of the display screen.

3. The radiotelephone of claim 1, wherein the display screen has a two-dimensional configuration with a width and length, and wherein the cleaning member extends along a direction substantially parallel with the length of the display screen and moves along a direction substantially parallel with the width of the display screen.

4. The radiotelephone of claim 1, wherein the cleaning member comprises a soft, absorbent material that wipes the display screen.

5. The radiotelephone of claim 4, wherein the soft, absorbent material is replaceable.

6. The radiotelephone of claim 1, wherein the cleaning member is replaceable.

7. A radiotelephone, comprising:
a first housing portion;
a display screen located on the first housing portion;
a second housing portion slidably connected to the first housing portion, wherein the first and second housing portions are slidable relative to one another between a retracted position and an extended, operative position; and
an elongated cleaning member movably secured to the first housing portion, wherein the cleaning member comprises a soft, absorbent material that wipes the display screen in response to movement of the first and second housing portions between the retracted and extended positions, and wherein the soft, absorbent material is removably secured to the cleaning member so as to be replaceable.

8. The radiotelephone of claim 7, wherein the display screen has a two-dimensional configuration with a width and length, and wherein the cleaning member extends along a direction substantially parallel with the width of the display screen and moves along a direction substantially parallel with the length of the display screen.

9. The radiotelephone of claim 7, wherein the display screen has a two-dimensional configuration with a width and length, and wherein the cleaning member extends along a direction substantially parallel with the length of the display screen and moves along a direction substantially parallel with the width of the display screen.

10. The radiotelephone of claim 7, wherein the cleaning member is replaceable.

* * * * *